UNITED STATES PATENT OFFICE.

HUGO GALLINOWSKY, OF NEWARK, NEW JERSEY.

ARTIFICIAL STONE.

SPECIFICATION forming part of Letters Patent No. 535,328, dated March 5, 1895.

Application filed May 19, 1892. Serial No. 433,611. (No specimens.)

*To all whom it may concern:*

Be it known that I, HUGO GALLINOWSKY, a citizen of the United States, residing at Newark, in the county of Essex and State of New Jersey, have invented certain new and useful Improvements in Artificial Stone; and I do hereby declare the following to be a full, clear, and exact description of the invention, such as will enable others skilled in the art to which it appertains to make and use the same.

The object of this invention is to provide an artificial stone having advantages in cost and adaptability to particular architectural and industrial purposes.

The said stone is composed of the following ingredients: calcined dolomite, potassium oxalate, to which a solution of oxalic acid has been added, and magnesium chloride, or matter resulting from the chemical union of said ingredients.

To produce an artificial stone from the use of the above, I proceed by first burning or calcining, by fire or acid calcination, the dolomite and thus secure a mixture of, say, fifty pounds calcium oxide and fifty pounds magnesium oxide, in one hundred pounds. These proportions vary, however, in the different natural dolomites. To the above one hundred pounds, I first add forty pounds of a saturated solution of potassium oxalate and ten pounds oxalic acid and twenty pounds of chloride of magnesium; to this one half pound, more or less, of chloride of ammonium.

I may employ any desired coloring matter, such as the metallic oxides, to give the desired tints to the stone and may introduce various fillers to secure various qualities other than are given by the above ingredients alone, such fillers for example as saw dust, wood pulp, hair, or other vegetable or animal fibers or tissues, sand, clay, slate dust or other ground stone, coal ashes, iron and other metallic ores, or other mineral matter.

What I claim as new is—

The composition of matter for artificial stone, consisting of calcined dolomite, oxalate of potassium and oxalic acid and chloride of magnesium, substantially as stated.

In testimony that I claim the foregoing I have hereunto set my hand this 13th day of May, 1892.

HUGO GALLINOWSKY.

Witnesses:
  CHARLES H. PELL,
  OSCAR A. MICHEL.